United States Patent [19]

Kondo et al.

[11] 4,245,071
[45] Jan. 13, 1981

[54] LOW PRESSURE POLYMERIZATION OF OLEFINS

[75] Inventors: Yozo Kondo, Okazaki; Toshikazu Kasai, Yamaguchi; Yoshiaki Kano, Wakayama, all of Japan

[73] Assignee: Solvay & Cie., Brussels, Belgium

[21] Appl. No.: 851,269

[22] Filed: Nov. 14, 1977

Related U.S. Application Data

[63] Continuation of Ser. No. 620,236, Oct. 6, 1975, abandoned.

[30] Foreign Application Priority Data

Oct. 18, 1974 [JP] Japan ................................. 49-120048

[51] Int. Cl.$^3$ .......................... C08F 4/02; C08F 10/00
[52] U.S. Cl. ................................ 526/114; 252/429 B; 252/429 C; 526/116; 526/124; 526/352
[58] Field of Search ........................ 526/114, 116, 124

[56] References Cited

U.S. PATENT DOCUMENTS

| 3,644,318 | 2/1972 | Diedrich et al. | 526/124 |
| 3,678,025 | 7/1972 | Birrell | 526/114 |
| 3,745,154 | 7/1973 | Kashiwa et al. | 526/116 |
| 3,901,863 | 8/1975 | Berger et al. | 526/116 |

FOREIGN PATENT DOCUMENTS 4637722 11/1971 Japan ....................................... 526/116

OTHER PUBLICATIONS

Encyclopedia of Chemical Technology, 2nd Ed., vol. 1, p. 832 and vol. 18, p. 189.
Zeiss, Organometallic Chemistry, Reinhold Publ. Corp. N.Y. (1960) p. 203.

Primary Examiner—Edward J. Smith
Attorney, Agent, or Firm—Pennie & Edmonds

[57] ABSTRACT

This invention relates to an improved process for the polymerization and copolymerization of olefins, to the novel catalytic component and catalytic system used for such polymerization and to a process for preparing such catalytic system, in which the polymerization of the olefins is carried out in the presence of a catalytic system comprising an organometallic compound of a metal of Group I, II, or III or the Periodic Table and a solid catalytic component obtained by reacting together metallic magnesium, a hydroxylated organic compound, an organic oxygenated compound of a metal of Group IVb, Vb, or VIb of the Periodic Table, an aluminum halide, and a halogen-containing compound of a metal of Group IVb, Vb or VIb of the Periodic Table.

12 Claims, No Drawings

LOW PRESSURE POLYMERIZATION OF OLEFINS

This is a continuation of application Ser. No. 620,236, filed Oct. 6, 1975, now abandoned.

BACKGROUND OF THE INVENTION

It is well known in the art that catalytic systems comprising a transition metal compound and an organometallic compound can be used for the low pressure polymerization of olefins. Various proposals have heretofore been made as to improvements of catalysts of this type.

It is known from British Pat. No. 1,140,649 of Oct. 17, 1967, that there can be used as a derivative of the transition metal of the catalytic systems mentioned above, a solid obtained by reacting a halogenated derivative of a transition metal with an oxygenated compound of a bivalent metal such as magnesium. The catalytic systems thus obtained are very active if they are compared with those in which the halogenated derivative of a transition metal is used as it is.

In Belgian Pat. No. 791,676 of Nov. 21, 1972, there are disclosed catalytic systems having one component which is obtained by reacting together:

(a) an oxygenated organic compound of a divalent metal such as a magnesium alcoholate or phenate;

(b) an oxygenated organic compound of a transition metal; and (c) an aluminum halide.

A polymerization process featuring advantages over processes using conventional catalysts is described in Y. Kondo et al U.S. patent application Ser. No. 501,879, filed Aug. 30, 1974. The solid catalytic complex, used together with an organometallic compound of a metal of Groups I to III of the Periodic Table according to that process, is obtained by reacting together:

(1) metallic magnesium, (2) a hydroxylated organic compound like monohydric and polyhydric organic alcohols and hydrocarbylsilanols, (3) an organic oxygenated compound of a transition metal of Group IVb, Vb, or VIb of the Periodic Table, and (4) an aluminum halide.

This process is able to provide polyolefins having a high impact resistance by using catalysts featuring high activities. However, the molecular weight distribution of the resultant polymers cannot be easily controlled.

SUMMARY OF THE INVENTION

It has now been found that solid catalytic components as defined above, can be prepared so as to provide for more easily controlled molecular weight distribution of the recovered polyolefin.

The present invention comprises a catalytic system, a catalytic component, a process for forming the catalytic component, and a process for the low pressure polymerization of alpha-olefins in which the polymerization is carried out in the presence of a catalytic system comprising an organometallic compound of a metal of Groups I, II or III of the Periodic Table and a solid catalytic component obtained by reacting together:

(1) a hydroxylated organic compound, (2) metallic magnesium, (3) an organic oxygenated compound of a metal or Group IVb, Vb, or VIb of the Periodic Table, (4) a halogen-containing compound of another metal of Group IVb, Vb, or VIb of the Periodic Table, and (5) an aluminum halide.

DETAILED DESCRIPTION

In describing the invention, the catalytic component and its preparation will first be described.

As the organic hydroxylated compound used, there are preferably employed alcohols, organic silanols and phenols.

The alcohol can be linear and branched aliphatic alcohols. Specific examples of suitable alcohols are:

Saturated or unsaturated straight-chain or branched, mono- and polyhydric aliphatic alcohols, e.g., methanol, ethanol, butanol, isobutanol, isopentanol, octanol and the like; allylalcohol; ethylene glycol; and Substituted or unsubstituted, saturated or unsaturated monohydric alicyclic alcohols, e.g., cyclopentanol, cyclohexanol and the like; 3-cyclopenten-1-ol.

Organic silanols having at least one hydroxyl group and an organic group selected from alkyl, cycloalkyl, arylalkyl, aryl, alkylaryl and aromatic groups, each having 1 to 12 carbon atoms, preferably 1 to 6 carbon atoms, are used as the organic silanol. Specific examples of suitable organic silanols are $(CH_3)_3SiOH$, $(C_2H_5)_3SiOH$, $(C_6H_5)_3SiOH$, $(tert-C_4H_9)(CH_3)_3SiOH$, and the like, and mixtures thereof.

As the phenol, there can be used substituted and unsubstituted mono and polyhydric alcohols, such as phenol, o-, m- and p-cresols, xylenol, resorcinol, hydroquinone, alpha- and beta-napthols, and the like.

Metallic magnesium to be used may take any of the powdery, particulate, foil-like, chip-like, and ribbon-like forms suitable for chemical reaction. Any of the grades usually utilized for carrying out organic reactions may be used in the present invention.

As the organic oxygenated compound, there are preferably employed compounds represented by the general formula $[TrO_x(OR)_y]_m$.

In the above general formula, Tr stands for a metal of Group IVb, Vb or VIb of the Periodic Table, with the use of Ti, Zr, V and Cr especially preferred, R represents an organic group, as defined below, and x and y are numbers such that $x \geq 0$ and $y > 0$ and are compatible with the atomic valency of the metal (Tr), and m is an integer. It is preferred to use an organic oxygenated compound in which x is a number within a range of $0 \leq x \leq 1$ and m is an integer within a range of $1 \leq m \leq 6$. Various organic groups can be used as R, but, in general, it is preferred to use as R an organic group having 1 to 20 carbon atoms, especially 1 to 10 carbon atoms (it was found that optimum results can be obtained when an organic group having 1 to 6 carbon atoms is used as R). As preferable organic groups, there can be mentioned such hydrocarbon groups as linear and branched alkyl groups, cycloalkyl groups, arylalkyl groups, aryl groups and alkylaryl groups. As specific examples of such organic oxygenated compounds, there are the alkoxides, phenates, oxyalkoxides, condensed alkoxides, and enolates, with $Ti(O-n-C_4H_9)_4$, $Ti(O-i-C_3H_7)_4$, $V(O-9-C_3H_7)_4$, $Zr(O-n-C_4H_9)_4$, $VO(O-i-C_3H_7)_3$, $Zr(OC_6H_5)_4$, $Zr(OCH_3)$ $[OC(CH_3)_3]_3$, $Ti_2O(O-i-C_3H_7)_4$, and the like, being illustrative.

Of course, use of organic oxygenated compounds having two or more different organic groups is included in the scope of this invention. Further, use of two or more different organic oxygenated compounds containing the same metal is included in the scope of this invention.

As the halogen-containing metal compound, there can be used compounds represented by the general formula $Tr'O_pX_q$. In this general formula, $Tr'$ stands for a metal of Group IVb, Vb or VIb of the Periodic Table, different from the metal of the oxygenated compound and use of Ti, Zr, V, Mo and Cr is especially preferred. X stands for a halogen atom, such as F, Cl, Br and I, and p and q are numbers of $p \geq 0$ and $q > 0$ which meet the atomic valency of the metal $Tr'$. It is preferred to use a halogen-containing metal compound in which p is within a range of $0 \leq p \leq 2$. As specific examples of the halogen-containing metal compound, there can be mentioned $ZrCl_4$, $VCl_4$, $MoCl_5$, $VOCl_3$, $ZrBr_4$, $ZrI_4$, $VBr_4$, $VI_4$, $TiCl_4$, $VCl_3$, etc. It is especially preferred to make use of an organic oxygenated compound of titanium as the oxygenated compound together with a chlorine containing compound of zirconium as the halogen-containing metal compound.

Use of a halogen-containing compound comprising two or more different halogen atoms is included in the scope of this invention. Further, use of two or more different halogen-containing compounds containing the same metal is included in the scope of this invention.

As the aluminum halide, there are employed compounds represented by the general formula $R'_zAlY_{3-z}$. In this general formula, $R'$ is a hydrocarbon group having 1 to 20 carbon atoms, preferably 1 to 6 carbon atoms, Y stands for a halogen atom, such as F, Cl, Br, and I, and z is a number within a range of $0 \leq z < 3$, and preferably $0 \leq z \leq 2$. It is preferred that $R'$ be selected from linear and branched alkyl groups, cycloalkyl groups, arylalkyl groups, aryl groups and alkylaryl groups. These aluminum halides can be used singly, and mixtures of two or more of them can also be used. Further, it is possible to use a trialkyl aluminum compound represented by the general formula $AlR'_3$ in combination with such aluminum halide compound.

As specific examples of the aluminum halide compound, there can be mentioned $AlCl_3$, $Al(C_2H_5)Cl_2$, $Al_2(C_2H_5)_3Cl_3$, $Al(C_2H_5)_2Cl$, etc. As pointed out above, a combination of the aluminum halide compound and trialkyl aluminum compound, such as a combination of $[AlCl_3 + \frac{1}{2}Al(C_2H_5)_3]$, can be used. If these compounds are combined in advance, a reaction sometimes occurs between them. The product formed by this reaction can also be used in this invention.

In this invention, various methods can be adopted for preparing the catalytic component in this invention. Typical instances of such methods will now be described, but it must be noted that the methods that can be adopted in this invention are not limited to these methods.

A first method comprises mixing an alcohol, organic silanol or phenol, metallic magnesium, and an organic oxygenated compound so that the ratio of alcohol to magnesium is preferably at least 2 moles per gram atom and the atomic ratio of magnesium to the metal in the organic oxygenated compound is within a range of from 100:1 to 0.05:1, preferably from 10:1 to 0.2:1, and heating and aging the mixture. The aging under heating is performed by treating the mixture in an inert gas atmosphere under reflux at atmospheric pressure or under an elevated pressure at 20° to 300° C., preferably 30° to 150° C., for 0.5 to 15 hours, preferably 1 to 6 hours. This aging may be conducted in the presence of an inert solvent. Any of inert solvents usually employed in this field can be used, and use of an alkane or cycloalkane having 4 to 20 carbon atoms, such as isobutane, n-pentane, n-hexane and cyclohexane, is especially preferred.

In this method, the above aging reaction can be greatly promoted by addition of one or more of polar substances capable of reacting with metallic magnesium or forming an adduct with metallic magnesium, such as iodine, mercuric chloride, xylene, alkyl halides, organic acid esters and organic acids.

If low-boiling-point substances are present in the aging reaction product, it is preferred that they be removed by distillation after completion of the aging reaction.

Then, a halogen-containing compound is added to the above reaction produce in such a manner that the mole ratio of the halogen-containing compound to the organic oxygenated compound is comprised between 0.1 and 10, more preferably between 0.2 and 1. Pressure and temperature conditions adopted at this step are not particularly critical, but it is generally preferred that the halogen-containing metal compound be added at room temperature. Then, the aging reaction is conducted at 30° to 150° C. for 0.5 to 15 hours, preferably 1 to 6 hours. It is possible to perform this reaction in the presence of an inert solvent such as mentioned above.

The aluminum halide is then added to the resulting aged composition to obtain the catalytic component. More specifically, the last step reaction is conducted at a temperature lower than 200° C. (preferably 0° to 60° C.) for 1 to 8 hours (perferably 2 to 4 hours) with a magnesium:aluminum atomic ratio ranging from 10:1 to 10:1000 (preferably from 1:10 to 10:200). The reaction product is composed of particles insoluble in the solvent used as a diluent. The reaction product is usually employed in this state suspended in an inert solvent, after the remaining unreacted substances and by-products have been removed by filtration or decantation and the reaction product has been washed several times with an inert solvent. If the reaction product is isolated after the washing step and heated and dried in an inert gas atmosphere, the resulting powder can be stored for a long time as the catalytic component without losing its properties.

A second method for preparing the catalytic component comprises reacting the organic hydroxylated compound and metallic magnesium under reflux at atmospheric pressure or under an elevated pressure at a temperature of 30° to 150° C. for 0.5 to 15 hours, preferably 1 to 6 hours, by using these reactants in such amounts that the ratio of hydroxylated compound to magnesium is at least 2 moles per gram atom. In some cases, this reaction is carried out in the presence of an inert solvent. This reaction can be greatly accelerated by addition of one or more polar substances capable of reacting with metallic magnesium or forming an adduct with metallic magnesium, such as iodine, mercuric chloride, xylene, alkyl halides, organic acid esters and organic acids. Then, an oxygenated organic compound is added directly to the resulting precipitate or suspension so that the atomic ratio of magnesium to the metal in the oxygenated compound is within a range as mentioned above with respect to the first method. Then, the aging reaction is carried out at a temperature of 50° to 200° C., preferably 90° to 160° C., for 5 minutes to 6 hours, especially 1.5 to 4 hours, while distilling off low-boiling-point substances. When the atomic ratio of magnesium to the metal in the oxygenated compound is great, an inert solvent is generally used as a diluent in this reaction and the reaction is performed under an elevated pressure. A halogen-containing metal compound is added to the so-formed aged composition under the same conditions as mentioned above with respect to the first method, and the mixture is aged. Then, the resulting composition is treated with an aluminum halide compound to form the catalyst component.

As a method similar to this second method, there can be mentioned a method where the hydroxylated organic compound and metallic magnesium are reacted, the resulting organic oxygenated magnesium compound is isolated and oxygenated organic compound and halogen-containing metal compound are added thereto to form a component which is then aged. The component is then treated with an aluminum halide to form the catalytic component. In this method, although the reaction rate is generally lower than in the second method in which no isolation is conducted, no substantial difference is brought about with respect to the effects intended in this invention.

A further method for obtaining the catalyst component comprises mixing all of the reactants, save for the aluminum halide, to form a mixture having a composition as mentioned above, aging the mixture under heating and treating the resulting aged reaction product with an aluminum halide.

The foregoing methods are given only for illustration, and, therefore, the preparation of the catalyst component is not limited by these methods.

In this invention, an organometallic compound of a metal of Group I, II or III or the Periodic Table is used as an activator and, together with the catalytic component, forms the catalytic system.

Among metals of Groups I, II and III of the Periodic Table, there are preferably used lithium, magnesium, zinc, tin, and aluminum, and use of aluminum is especially preferred.

An alkyl group can be mentioned as a typical example of the organic group of the organometallic compound, and linear and branched alkyl groups having 1 to 20 carbon atoms are preferably employed.

As typical examples, there can be mentioned n-butyl lithium, diethyl magnesium, diethyl zinc, trimethyl aluminum, triethyl aluminum, tri-isobutyl aluminum, tri-n-butyl aluminum, tri-n-decyl aluminum, tetraethyl tin, tetrabutyl tin, and the like. In general, it is preferred to use trialkyl aluminum having a linear or branched alkyl group having 1 to 10 carbon atoms.

In addition, an alkyl metal hydride having an alkyl group of 1 to 20 carbon atoms can be used as the organometallic compound. As such compound, there can be mentioned, for example, di-isobutyl aluminum hydride and trimethyl tin hydride.

Also suitable are alkyl metal halides having an alkyl group of 1 to 20 carbon atoms, such as ethyl aluminum sesqui-chloride, diethyl aluminum chloride and di-isobutyl aluminum chloride.

Furthermore, it is possible to use an organic aluminum compound obtained by reaction between a trialkyl aluminum or dialkyl aluminum hydride having an alkyl group of 1 to 20 carbon atoms and a diolefin having 4 to 20 carbon atoms, such as isoprenyl aluminum.

In this invention, polymerization of olefins can be conducted under ordinary reaction conditions of the so-called Ziegler process. More specifically, the polymerization is carried out continuously or batchwise at 20° to 200° C., especially at 50° to 90° C. in the case of a slurry or at 120° to 150° C. in the case of a solution.

The polymerization pressure is not particularly critical, but it is preferred that the polymerization be conducted under an elevated pressure, especially 1.5 to 50 atmospheres. It is desred that the polymerization be performed in the presence of an inert solvent. Any of the inert solvents customarily used in this field can be employed in this invention. Use of an alkane or cycloalkane having 4 to 20 carbon atoms, such as isobutane, n-pentane, n-hexane and cyclohexane, is especially preferred.

The amount used of the organometallic compound is 0.02 to 50 millimoles, preferably 0.2 to 5 millimoles per liter of the solvent or per liter of the reaction vessel.

As the monomer to be polymerized according to the process of this invention, there are employed $\alpha$-olefins represented by the general formula $R-CH=CH_2$ in which R stands for hydrogen or a hydrocarbon residue, especially a linear or branched, substituted or unsubstituted alkyl group having 1 to 10 carbon atoms, especially 1 to 8 carbon atoms. As such olefin, there can be mentioned, for example, ethylene, propylene, butene-1, pentene-1, 4-methylpentene-1, octene-1, and the like.

A mixture of two or more of these $\alpha$-olefins can be polymerized in this invention. In this invention, it is preferred that ethylene of a mixture of ethylene and an $\alpha$-olefin other than ethylene be polymerized.

The molecular weight of the resulting polymer can be adjusted according to known methods, for example, a method in which hydrogen is present in the reaction system.

Characteristic features and advantages of the process of this invention are as follows:

The most prominent effect attained by this invention is that the molecular weight distribution in the resulting polymer can easily be controlled. The ratio of the high load melt index (HLMI determined under condition of E according to ASTM D-1238) to the melt index (MI determined under condition of F according to ASTM-1238) is used as a criterion for the molecular weight distribution. It is considered that as this HLMI/MI ratio is large, the molecular weight distribution range is broad. However, it must be noted that the HLMI/MI value has a relation to the MI value and, as the MI value decreases, the HLMI/MI ratio tends to increase. In general, a polymer having a small HLMI/MI value is suitable for injection molding and a molded article having a high impact strength can be obtained from such polymer by injection molding. In contrast, a polymer having a large HLMI/MI value is preferred for blow molding and a molded article having good surface conditions can be obtained from such polymer. The HLMI/MI value can be reduced by increasing the ratio of organic oxygenated compound to the magnesium. Accordingly, the HLMI/MI value can be controlled to some extent according to our previously proposed processes. In this invention, which is characterized in that a halogen-containing metal compound is further incorporated, the HLMI/MI value can be controlled more broadly and easily than previously by changing the atomic ratio between the metal in said halogen containing metal compound and the metal in the organic oxygenated compound processes. Especially, an excellent effect for increasing the HLMI/MI value can be attained in this invention. For example, if $ZrCl_4$ is used as the halogen-containing metal compound and the ratio thereof to the organic oxygenated compound is increased, it is possible to obtain a large HLMI/MI value. The previously proposed catalytic systems free of a halogen-containing metal compound are suitable mainly for the production of poly-olefins of a high impact resistance for injection molding. In contrast, in the catalytic system of this invention, any of polyolefins suitable for injection molding, blow molding and film molding can be provided by controlling the ratio among the starting materials during the catalyst preparation stage. It is one of the great advantages of this invention that various poly-olefin products applicable to various fields can be provided by one catalyst system.

Another characteristic feature of this invention is that a complicated magnesium compound requiring severe control or maintenance on preparation, handling, purchase and quality standards need not be used, but metallic magnesium which can easily be purchased, stored and controlled is used.

Further, in this invention, the catalytic activity, namely, the weight of the polymer obtained per unit amount of the catalyst, is very high. Accordingly, it is unnecessary to remove the catalyst from the resulting polymer, and occurrence of undesired phenomena, such as degradation and discoloration at the molding step, can be prevented.

Still further, powder of a polymer obtained when ethylene is used as the starting olefin has a high apparent specific gravity, and, therefore, the process of this invention is very advantageous from the industrial viewpoint.

This invention will be further described in connection with the following examples of the practice of it and which are given for purposes of illustration only.

EXAMPLE 1

(a) Preparation of Catalytic Component

A 1000-cc capacity flask equipped with an agitator was charged with 64.1 g. (0.80 mole) of butanol, and 0.5 g of iodine, 4.86 g (0.20 gram atom) of metallic magnesium powder and 17.0 g (0.05 mole) of $Ti(O-n-C_4H_9)_4$ were added thereto. Then, 11.65 g (0.05 mole) of $ZrCl_4$ was gradually added while paying attention to the temperature, and the temperature of the mixture was elevated to 80° C. and the mixture was agitated for 2 hours under nitrogen seal while discharging generated hydrogen gas. Then, the temperature was elevated while distilling off low-boiling-point substances, to complete the aging reaction. Then, the reaction mixture was cooled to 60° C. and 200 ml. of n-hexane was added. Then, 348 ml. of a 50% solution of ethyl aluminum dichloride was added at 45° C. to the mixture over a period of 3 hours so that the inside temperature was not elevated. After completion of the gradual addition, the temperature was elevated and the mixture was agitated at 60° C. for 1 hour. n-Hexane was added to the reaction product and the mixture was washed repeatedly until no chloride ion was detected in the supernatant. After the supernatant of the suspension had been thus removed, the residue was dried under an atmosphere of dried nitrogen to obtain 36.3 g of a mud-yellow powder, elementary analysis values of which were 5.33% of Ti, 10.3% of Zr, 62.0% of Cl, 11.1% of Mg, and 2.8% of Al.

(b) Polymerization of Ethylene

The inside atmosphere of a 1.6 l capacity stainless steel autoclave of the electromagnetic agitation type was sufficiently replaced by nitrogen, and 1 l of n-hexane was charged in the autoclave and the inside temperature was adjusted to 60° C. Then, 0.20 g (1.0 millimole) of tri-isobutyl aluminum and 46 mg of the dried powdery catalytic component prepared in (a) above were charged into the autoclave.

The inside pressure of the autoclave was adjusted to one atmosphere. Then, hydrogen under a pressure of 16 atmospheres was charged and ethylene was continuously charged for 2 hours so that the total pressure was 20 atmospheres gauge, to thereby perform polymerization. After completion of the polymerization, the reaction mixture was cooled to expel the unreacted gas, and the resulting polyethylene was separated from the solvent by filtration and dried to obtain 170 g of polyethylene having a melt index of 0.30 g/10 min. and an apparent density of powder of 0.34 g/cm$^3$. The yield of polyethylene per g of solid catalytic component was 3700 g and the HLMI/MI value was 121.

EXAMPLE 2

(a) Preparation of Catalytic Component

A 1.6 l capacity autoclave equipped with an agitator was charged with 32.6 g (0.42 mole) of bucanol, 0.5 g of iodine, 4.86 g (0.20 gram atom) of metallic magnesium powder and 17.02 g (0.05 mole) of $Ti(O-n-C_4H_9)_4$, and 200 ml of n-hexane was added thereto and the temperature was elevated to 80° C. The mixture was agitated for 1 hour under nitrogen seal while discharging generated hydrogen gas. Then, the temperature was elevated to 120° C. and the reaction was conducted for 1 hour. Then, the temperature was lowered to 60° C. and 5.85 g (0.025 mole) of $ZrCl_4$ was gradually added to the reaction mixture. Then, the temperature was elevated to 120° C. again, and the aging reaction was conducted for 1 hour. Then, 348 ml of a 50% hexane solution of ethyl aluminum dichloride was added over a period of 3 hours so that the inside temperature was not elevated, and the mixture was agitated at 50° C. for 1 hour. When the reaction product was washed with n-hexane in the same manner as described in (a) of Example 1, there was obtained 20.4 g of a mud-yellow powder, the elementary analysis values of which were 6.29% of Ti, 2.3% of Zr, 61.5% of Cl, 13.2% of Mg and 3.6% of Al.

(b) Polymerization of Ethylene

In the same manner as described in (b) of Example 1, ethylene was polymerized for 2 hours in the presence of hydrogen of 11 atmospheres by using 0.30 g (1.5 millimoles) of tri-isobutyl aluminum and 23 mg of the dried powdery catalytic component prepared in (a) above while maintaining the total pressure at 20 atmospheres gauge, to obtain 221 g of polyethylene having a melt index of 0.32 g/10 min., an apparent density of powder of 0.32 g/cm$^3$ and an HLMI/MI value of 91.0. The yield of polyethylene per g of solid catalytic component was 9610 g.

EXAMPLES 3 to 6

Catalytic components were prepared in the same manner as in (a) of Example 1 except that the mixing ratios of the starting materials were changed as indicated below.

More specifically, the following ratios were adopted in Example 1:

$Ti(O-n-C_4H_9)_4/Mg = 0.25$ (mole/gram atom), $ZrCl_4/Ti(O-n-C_4H_9)_4 = 1$ (mole/mole).

and $AlC_2H_5Cl_2/Mg = 6$ (mole/gram atom), when in Example 3 the $ZrCl_4/Ti(O-n-C_4H_9)_4$ ratio was changed to 0.2, in Example 4 the $ZrCl_4/Ti(O-n-C_4H_9)_4$ ratio was changed to 0.50, in Example 5 the $Ti(O-n-C_4H_9)_4/Mg$ ratio was changed to 1, and in Example 6 the $Ti(O-n-C_4H_9)_4/Mg$ ratio was changed to 1 and the $AlC_2H_5Cl_2/Mg$ ratio was changed to 9. By using the obtained catalytic components, ethylene was polymerized in the same manner as described in (b) of Example 1 to obtain results shown in Table I below.

EXAMPLE 7

A catalyst was prepared in the same manner as described in (a) of Example 1 except that $C_2H_5OH$ was used instead of $n-C_4H_9OH$. By using the so obtained catalytic component, ethylene was polymerized under the same conditions as described in (b) of Example 1 to obtain results shown in Table I below.

EXAMPLES 8 to 11

Catalytic components were prepared in the same manner as described in (a) of Example 1 except that various halogen-containing compounds indicated below were used instead of $ZrCl_4$:

Example 8: $VCl_4$
Example 9: $VCl_3$
Example 10: $VOCl_3$
Example 11: $MoCl_3$

Ethylene was polymerized by using the so obtained catalytic components in the same manner as described in (b) of Example 1.

COMPARATIVE EXAMPLE 1

(a) Preparation of the Catalytic Component

In the same manner as described in (a) of Example 2, a mixture of 32.16 g (0.42 mole) of butanol, 0.5 g of iodine, 4.86 g (0.20 gram atom) of metallic magnesium powder, 17.02 g (0.05 mole) of $Ti(O-n-C_4H_9)_4$ and 200 ml of hexane was aged and reacted at 120° C. while discharging hydrogen formed by the reaction. *Without* addition of $ZrCl_4$, 348 ml of a 50% hexane solution of ethyl aluminum dichloride was added at 45° C. over a period of 3 hours, and the mixture was agitated at 50° C. for 1 hour. The reaction produce was washed with n-hexane and dried to obtain 17.0 g of a light-brown powder, the elementary analysis values of which were 7.99% of Ti, 67.8% of Cl, 12.3% of Mg and 3.9% of Al.

(b) Polymerization of Ethylene

In the same manner as described in (b) of Example 1, ethylene was polymerized for 2 hours in the presence of hydrogen of 9.5 atmospheres by employing 0.30 g (1.5 millimoles) of tributyl aluminum and 25 mg of the dried powdery catalytic component obtained in (a) above so that the total pressure was 20 atmospheres gauge, to obtain 260 g of polyethylene having a melt index of 0.29 g/10 min., an apparent density of powder of 0.32 g/cm$^3$ and an HLMI/MI value of 59.5. The yield of polyethylene per g of catalytic component was 10400 g.

COMPARATIVE EXAMPLE 2

(a) Preparation of the Catalytic Component

A catalytic component was prepared in the same manner as described in (a) of Example 1 except that $Ti(O-n-C_4H_9)_4$ was not used. More specifically, 66.8 g (0.90 mole) of butanol, 0.5 g of iodine and 4.86 g (0.20 gram atom) of metallic magnesium powder were charged in the flask, and 11.66 g (0.05 mole) of $ZrCl_4$ was added while paying attention to the temperature and hydrogen formed was removed. Then, the aging reaction was conducted at 120° C. while removing low-boiling-point substances. Then, 348 ml of a 50% hexane solution of ethyl aluminum dichloride was added at 45° C. to the reaction product. The product was washed with n-hexane and dried to obtain 32.3 g of white powder.

(b) Polymerization of Ethylene

In the same manner as described in (b) of Example 1, ethylene was polymerized for 2 hours in the presence of hydrogen of 18 atmospheres by using 0.30 g (1.5 millimoles) of tri-isobutyl aluminum and 422 mg of the dried powdery catalytic component obtained in (a) above so that the total pressure was 20 atmospheres gauge, to obtain 275 g of polyethylene having a melt index of 0.01 g/10 min., an apparent density of powder of 0.30 g/cm$^3$ and and HLMI/MI value of 66.9. The yield of polyethylene per g of the solid catalytic component was 650 g.

COMPARATIVE EXAMPLE 3

5 g of the powdery catalytic component prepared in Comparative Example 1 was mixed with 2.1 g of powder of $ZrCl_4$ (the weight ratio of Zr to Ti was about 2). In the same manner as described in (b) of Example 1, ethylene was polymerized by using the so obtained mixed catalyst.

Procedures and results of the foregoing Examples of the invention and Comparative Examples not utilizing the invention are summarized in Table I below.

TABLE I

| (a) Preparation of Catalytic Component | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| (1) organic hydroxylated compound | n-C₄H₉OH | n-C₄H₉OH | n-C₄H₉OH | n-C₄H₉OH | n-C₄H₉OH | n-C₄H₉OH | C₂H₅OH | n-C₄H₉OH | n-C₄H₉OH | n-C₄H₉OH | n-C₄H₉OH |
| (gram mole) | 0.80 | 0.42 | 0.80 | 0.80 | 0.80 | 0.80 | 0.80 | 0.80 | 0.80 | 0.80 | 0.80 |
| (2) metallic magnesium (gram atom) | 0.20 | 0.20 | 0.20 | 0.20 | 0.10 | 0.10 | 0.20 | 0.20 | 0.20 | 0.20 | 0.20 |
| (3) organic oxide compound of metal | → | → | → | → | → | Ti(O-nC₄H₉)₄ | → | → | → | → | → |
| (gram mole) | | | | | | 0.10 | | | | | |
| (4) halogen-containing metal compound | 0.05 ZrCl₄ | 0.05 ZrCl₄ | 0.05 ZrCl₄ | 0.05 ZrCl₄ | 0.10 ZrCl₄ | 0.10 ZrCl₄ | 0.05 ZrCl₄ | 0.05 VCl₄ | 0.05 VCl₃ | 0.05 VOCl₃ | 0.05 MoCl₃ |
| (5) aluminum halide compound (gram mole) | 0.05 → 1.2 | 0.025 → 1.2 | 0.01 → 1.2 | 0.025 → 1.2 | 0.10 → 0.60 | 0.10 AlC₂H₅Cl₂ 0.90 | 0.05 → 1.2 | 0.025 → 1.2 | 0.05 → 1.2 | 0.08 → 1.2 | 0.05 → 1.2 |
| Yield (g) of catalytic component | 36.3 | 20.4 | 34.2 | 34.5 | 45.0 | 62.5 | 43.3 | 27.4 | 48.5 | 36.7 | 41.0 |

| (b) Preparation of Polyethylene | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Catalyst activity [g of polyethylene/g of catalytic component (A)] | 3,700 | 9,610 | 13,000 | 10,300 | 8,500 | 12,900 | 1,800 | 18,400 | 13,400 | 25,700 | 7,200 |
| Apparent density (g/cm³) of polyethylene powder | 0.34 | 0.32 | 0.32 | 0.31 | 0.35 | 0.33 | 0.29 | 0.30 | 0.33 | 0.34 | 0.37 |
| Melt Index [g/10 min.] of polyethylene (MI) | 0.30 | 0.32 | 0.20 | 0.25 | 0.074 | 0.088 | 0.23 | 0.18 | 1.33 | 2.20 | 0.38 |
| HlMl/MI | 121 | 91.0 | 63.0 | 84.2 | 74.2 | 84.3 | 152 | 66.8 | 49.5 | 52.6 | 48.2 |

| | Comparative Example 1 | Comparative Example 2 | Comparative Example 3 |
|---|---|---|---|
| (a) Preparation of Catalytic Complex | | | mixed catalytic complex |
| (1) organic hydroxylated compound | n-C₄H₉OH | n-C₄H₉OH | Catalytic complex of Comparative Ex. 1 + powdery ZrCl₄ |
| (gram mole) | 0.42 | 0.9 | |
| (2) metallic magnesium | Mg | Mg | Zr/Ti weight ratio = 2 |
| (gram atom) | 0.20 | 0.20 | |
| (3) organic oxygenated compound of metal | Ti(O-nC₄H₉)₄ | X | |
| (gram mole) | 0.05 | | |
| (4) halogen-containing metal compound | | ZrCl₄ | |
| (gram mole) | | 0.05 | |
| (5) aluminum halide compound | AlC₂H₅Cl₂ | AlC₂H₅Cl₂ | |
| (gram mole) | 1.2 | 1.2 | |

TABLE I-continued

| | | Comparative Example 1 | Comparative Example 2 | Comparative Example 3 |
|---|---|---|---|---|
| Yield (g) of catalytic complex | | 17.0 | 32.3 | |
| (b) Preparation of Polyethylene | | | | |
| Catalyst activity [g of polyethylene/g of catalytic complex] | | 10,400 | 650 | 10,700 |
| Apparent density (g/cm$^3$) of polyethylene powder | | 0.32 | 0.30 | 0.31 |
| Melt Index (g/10 min.) of polyethylene (MI) | | 0.29 | 0.01 | 0.94 |
| HlMI/MI | | 59.5 | 66.9 | 52.0 |

While the invention has been described in connection with a preferred embodiment, it is not intended to limit the invention to the particular form set forth above, but, on the contrary, it is intended to cover such alternatives, modifications, and equivalents as may be included within the spirit and scope of this invention as defined by the appended claims.

What is claimed is:

1. A process for the polymerization and copolymerization of alpha-olefins comprising carrying out the polymerization or copolymerization in the presence of
   (A) an organometallic compound of a metal of Group I, II and III of the Periodic Table; and
   (B) a solid catalytic complex formed by reacting together the reactants consisting essentially of metallic magnesium, a hydroxylated organic compound containing at least one hydroxyl group bonded to carbon or silicon atom, an organic oxygenated compound of a metal of Group IVb, Vb, or VIb of the Periodic Table in which an organic radical containing from 1 to 20 carbon atoms is attached to the metal via oxygen and said oxygenated compound does not contain metal to halogen bonds therein, a halogen-containing compound of a metal of Group IVb, Vb or VIb of the Periodic Table, said metal being different from the metal in said organic oxygenated compound, and an aluminum halide.

2. The process of claim 1, wherein the organic oxygenated compound corresponds to the general formula $[TrO_x(OR)_y]_m$ in which Tr is a transition metal of Group IVb, Vb, or VIb of the Periodic Table, R is a $C_1$–$C_{20}$ organic radical $x \geq 0$, $y > 0$, x and y being compatible with the valency of Tr, and m is an integer, the halogen-containing compound corresponds to the general formula $Tr'O_pX_q$ in which Tr' is a metal of Group IVb, Vb, VIb of the Periodic Table different than the metal in said organic oxygenated compound, X is a halogen, and p and q are numbers such that $p \geq 0$ and $q > 0$ and meet the atomic valency of the metal Tr, and the aluminum halides correspond to the general formula $R'_zAlY_{3-z}$ wherein R' is a $C_1$–$C_{20}$ hydrocarbon radical, Y is a halogen, and z is any number such that $0 \leq z < 3$.

3. The process of claim 2 wherein the hydroxylated organic compound is selected from monohydric and polyhydric organic alcohols having from 1 to 12 carbon atoms per hydroxyl group; the transition metal (Tr) is selected from titanium, zirconium, vanadium or chromium; and as to the aluminum halide, R' is a $C_1$–$C_6$ saturated aliphatic radical, X is chlorine, and $0 \leq z \leq 2$.

4. The process of claim 1 in which the aluminum halide consists of one compound of the formula $R'_zAlY_{3-z}$ and one compound of the formula $AlR'_3$ wherein R' is a $C_1$–$C_{20}$ hydrocarbon radical, and Y is a halogen.

5. The process of claim 4 in which the alcohol is a saturated monohydric aliphatic alcohol containing from 1 to 6 carbon atoms.

6. The process of claim 4 in which the alcohol is an unsubstituted monohydric aromatic alcohol.

7. The process of claim 2 in which the hydroxylated organic compound is a hydrocarbylsilanol.

8. The process of claim 1 wherein the organic oxygenated compound corresponds to the general formula $[TrO_x(OR)_y]_m$ in which Tr is titanium, R is a $C_1$–$C_{20}$ organic radical, $x \geq 0$, $y > 0$, x and y being compatible with the valency of titanium, and m is an integer, the halogen-containing compound corresponding to the general formula $Tr'O_pX_q$ in which Tr' is zirconium, X is a chlorine, and p and q are numbers of $p \geq 0$ and $q > 0$ which meet the atomic valency of zirconium.

9. The process of claim 8 wherein the aluminum halide corresponds to the general formula $R'_zAlY_{3-z}$ wherein R' is a $C_1$–$C_{20}$ hydrocarbon radical, Y is a halogen, and z is any number such that $0 \leq z < 3$.

10. The process of claim 1 wherein the alpha-olefin is ethylene.

11. A process for the polymerization and copolymerization of alpha-olefins comprising carrying out the polymerization or copolymerization in the presence of
    (A) an organometallic compound of a metal of Group I, II and III of the Periodic Table; and
    (B) a solid catalytic complex obtained by reacting together the reactants consisting essentially of metallic magnesium, a saturated monohydric aliphatic alcohol having from 1 to 6 carbon atoms therein, an organic oxygenated compound of titanium in which an organic radical containing from 1 to 20 carbon atoms is attached to the titanium atom via oxygen and which does not contain titanium to halogen bonds therein, a halogen-containing compound of zirconium, and an aluminum halide; said monohydric aliphatic alcohol, metallic magnesium, and organic oxygenated titanium compound are first reacted together to form the reaction product in amounts such that the ratio of alcohol to magnesium is at least two mole/gram-atom and the atomic ratio of magnesium to titanium is within the range of from 10:1 to 0.2:1, adding the halogen-containing zirconium compound to said reaction product in amounts such that the mole ratio of the zirconium compound to the titanium compound is between 0.2 and 1 to form a solid composition which is aged at 30 to 150° C. and then reacting the aged composition with the aluminum halide to form the catalytic complex.

12. The process according to claim 11 wherein the alpha-olefin is ethylene.

* * * * *